July 8, 1924.                     1,500,316
W. E. HAMLIN
ANIMAL COVER
Filed Feb. 13, 1923
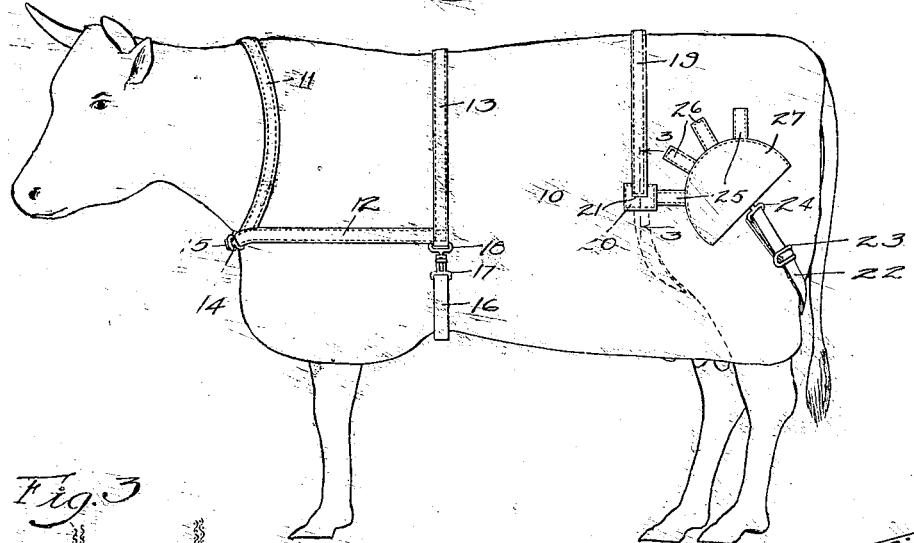
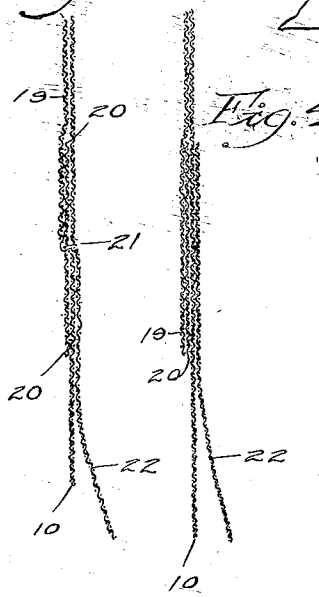
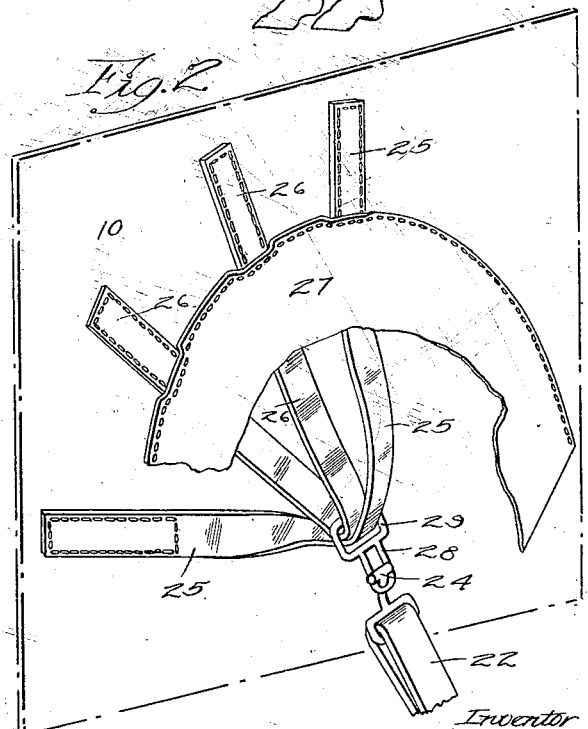

Patented July 8, 1924.

1,500,316

UNITED STATES PATENT OFFICE.

WILLIAM EDWIN HAMLIN, OF DES MOINES, IOWA.

ANIMAL COVER.

Application filed February 13, 1923. Serial No. 618,790.

*To all whom it may concern:*

Be it known that I, WILLIAM EDWIN HAMLIN, a citizen of the United States, and a resident of Des Moines, in the county of Polk and State of Iowa, have invented a certain new and useful Animal Cover, of which the following is a specification.

My invention relates to blankets used for protecting animals such as cows, horses, or the like.

The object is to provide a protective covering for the animal, which will maintain the surface of the hide in a glossy condition and free from dirt.

A further object is to provide such a blanket which will not become disengaged from the animal.

More specifically, it is my object to provide such a blanket, having reinforcing bands sewed thereto around the middle portion and the rear portion thereof, and having means for fastening the blanket fixed to the ends of said reinforcing bands.

A still further object is to provide a rear fastening member comprising a strap adapted to pass from the front portion of the animals flank, around and underneath the leg and thence around the outside of the leg to a point adjacent the starting point, where it is fastened by means of a detachable connection to anchoring means fixed to the blanket on its upper surface.

A still further object is to provide said anchoring means in the form of loops having a link slidably received thereon, and to provide a protective cover member for said slidable connection.

The purpose of the slidable connection is to shift the strain which is imposed upon the blankets, when the direction of pull upon the strap is changed and to thus prevent the possibility of the anchoring means being disconnected from the blanket.

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

Figure 1 is a side view of a cow with my improved blanket arranged thereon.

Figure 2 is a perspective view of the anchoring means and the slidable connection.

Figure 3 is a detail, sectional view taken on line 3—3 of Figure 1; and

Figure 4 is a slightly modified form of the parts shown in Figure 3.

It is well known to stock men and breeders of high grade animals that the appearance of an animal is greatly improved by protecting the animal's coat with a blanket. In the winter it is highly desirable to provide some sort of protection for milking cows, which will tend to keep them warmer than they would otherwise be. When a cow is thus made more comfortable, she will give more milk than otherwise. Where a stock breeder wishes to display his animals, at an exhibition, it is desirable to keep the animal's appearance as slick as possible.

It is necessary to provide a blanket which will remain on the animal while it is moving about. When the animal lies down or rises from the prone position, any ordinary fastening is likely to give way or at least allow the blanket to slip from the proper position. The blanket must be so fastened to the animal that the securing means will not interfere with the movements of the animal and at the same time will not be broken or torn from the blanket when any extra strain is put thereon.

My improved blanket is designed to overcome all of the difficulties mentioned and to meet all of the requirements of a blanket which will stand the test of hard and long usage under all circumstances.

I have used the reference numeral 10 to indicate generally the blanket, which may be made of suitable material such as duck or felt or of heavy burlap. The general shape of the blanket is oblong, when spread out. There is a portion cut away at one end in order to form a yoke for the neck of the animal. This cut away portion is bounded by a strap or band 11. On each side of the blanket, spaced from the sides thereof, is a reinforcing band 12, which extends from the front end of the blanket at the termination of the band 11 toward the rear of the blanket.

A reinforcing band 13 connects the two bands 12 at their ends and when the blanket is placed over an animal, extends across the back and the sides thereof. To the forward end of the other band 12 is fixed a hook member 15 which is designed to enter the loop 14 for securing the two ends of the bands 12 together.

Fixed to one end of the band 13 is a strap 16, to the end of which is fixed a loop 17 similar to the loop 15. To the other end of the band 13 is fixed a hook 18. The strap 16 is adapted to encircle the belly of the animal and the loop 17 to receive the hook 18 for securing the strap 16 in place.

Spaced from the rear end of the blanket are reinforcing plates 20. In the center of each is a slot 21. A slot is cut in the blanket which registers with the slot 21, and the strap 19 at each end is passed through both slots to the under side of the blanket. The strap 19 is sewed to the blanket at all points between the two plates 20. The plates 20 are sewed to the blanket, and the strap 19 is sewed to the plates 20 and to the blanket at all points where it crosses the plates 20, both on the upper and the underside of the blanket (see Figure 3).

Each end of the strap 19 thence extends for some length free of the blanket. I will refer to this free portion with the numeral 22. The strap 22 passes through a frictional adjusting buckle 23 and thence through a hook 24, which is slidably mounted on the strap 22, and thence back to the buckle 23 where it is fixed thereto. By sliding the buckle 23 the length of the strap 22 can be changed.

On each side of the blanket, a short strap 25 is fixed to the blanket at one end adjacent the plate 20. The strap 25 extends free of the blanket toward the end of the blanket for a short distance and then is twisted through an angle of approximately 180 degrees, and at the same time bent toward the center of the blanket. The other end is fastened to the blanket. The result is an L-shaped loop having its ends fastened and the central portion free.

Another strap 26 is fixed to the blanket approximately one-third of the distance between the two ends of the loop 25 and extends to the bend in the loop 25 where it is bent back upon itself and fastened to the blanket, at a point between its other end and the end of the loops 25.

A protective cover 27 in the shape of a section of a circle is sewed to the blanket at its periphery, which crosses the ends of the straps 25 and 26. The cover 27 is in the form of an inverted pocket with the lower side open. It is designed to cover the free ends of the loops 25 and 26. The hook 24 is designed to be received in the loop 28 for securing the end of the strap 22 to the blanket.

When the blanket is placed on the cow, the strap 22 is passed around and under the leg of the animal and thence upwardly and it is then fastened to the anchor loops 25 and 26.

It will be seen that when the cow lies down, the contraction of the muscles in the leg will tend to increase the strain upon the strap 22 and to change the direction of the pull. Where the anchoring loops 25 and 26 are used, there is very little possibility of the outer connection of the strap 22 pulling loose from the blanket because of the four points of jointure of the loops to the blanket.

When the direction of the pull upon the strap 22 is changed, the loop 28 will shift enough to equalize the strain upon the loops 25 and 26. This shifting will tend to provide a flexible connection for the strap 22 whereby it will be allowed to give slightly when any undue strain is put upon it thus the possibility of tearing the connection loose from the blanket is reduced to a minimum. At the same time, the flexible connection will tend to prevent the disarranging of the blanket from its proper position.

I have found by actual experience that my blanket will stay in place upon an animal while she is going through the motions of kicking, of running, and of lying down. The cover member 27 protects the loops 25 and 26 from accumulating dirt and foreign matter from the stall of the animal, and thus prevents the clogging of the slidable connection betwen the loop 28 and the loops 25 and 26.

It will be noted that it is not necessary to fasten the strap 22 to the strap 19, but that the strap 19 may be terminated on the outside of the blanket and the strap 22 secured at a point directly thereunderneath, as shown in Figure 4.

Some changes may be made in the construction and arrangement of the various parts of my invention, without departing from the real spirit and purpose of my invention and it is my intention to cover by my claims, any modified forms of structure or use of mechanical equivalents, which may be reasonably included within their scope.

I claim as my invention:

1. A protective blanket for animals comprising a sheet of material, means for fastening the blanket around the neck of the animal, and means for fastening the rear end of the blanket to the hind legs of the animal, said means including straps fastened to the underside of the blanket at points spaced from the sides and end of the blanket, flexible loops attached to the upper side of the blanket, said straps being adapted to be passed around and under the rear legs of the animal and slidable connections between said flexible loops and the straps.

2. A protective blanket for animals comprising a rectangular sheet of material, means for fastening the blanket around the neck of the animal and means for fastening the rear end of the blanket to the hind legs of the animal, said means including straps fastened to the underside of the blanket at points spaced from the sides and end of the blanket, flexible loops attached to the upper side of the blanket, said straps being adapted to be passed around and under the rear legs of the animal, slidable connections between said flexible loops and the straps, and protective covers for said flexible loops.

3. A protective blanket for animals comprising a sheet of material, means for fastening the front end of said sheet around an animal, and means for fastening the rear end of said sheet to the hind legs of the animal, said last means including straps fixed to the sheet, a flexible loop fixed to the sheet at either side of the rear portion thereof, each of said loops having its ends attached to the blanket at points spaced from each other, and slidable connections between the straps and the loops.

4. A protective blanket for animals, comprising a blanket member, means for fastening the front end of said blanket around the animal, and means for fastening the rear end of the blanket to the hind legs of the animal, said means comprising straps fixed to the blanket on one side, flexible loops having their ends fixed at different points to the other side of the blanket, means for slidably connecting the free ends of said straps to the respective loops, and protective covers for the loops and last-named fastening means, said covers being free from connection with the blanket along one edge of each cover.

5. A protective blanket for animals comprising a blanket member, means for fastening the rear end of the blanket member to the rear legs of the animal, said means comprising straps each fastened at one end to one side of the blanket, a flexible member fastened to the other side of the blanket, and means for connecting the straps and respective flexible members, and cover members secured to the blanket at their upper portions and disconnected from the blanket at their lower edges for covering the flexible members and fastening means and yet allowing free access thereto.

6. A protective blanket for animals comprising a blanket member, means for fastening the front end of said blanket member around an animal, means for fastening the rear end of said blanket member to the rear legs of the animal, said latter means comprising straps fixed to the one side of the blanket, flexible loops fixed to the other side of the blanket, means on the ends of said straps for slidably securing them to said flexible loops and protective covers designed to protect the sliding connection between the straps and the loops, said protective covers being in the form of inverted pockets, the upper edges of which are fastened to the blanket and the lower edges of which are free of the blanket thereby permitting the straps to be disengaged from the flexible loops.

7. A protective blanket for animals such as cattle including a blanket member, means for fastening the blanket around the front quarters of the cow, means for fastening the blanket to the rear legs of the cow, said means including a reinforcing band spaced from the rear end of the blanket, fixed to the blanket and extending from the center of the blanket in either direction to points midway between the center and the sides of the blanket, said band being thence passed through the blanket and having its ends extended free of the blanket and underneath the blanket to form straps, flexible loops fixed to the upper side of the blanket, said straps being adapted to extend under and around the legs of the animal and means for slidably securing the ends of said straps to said flexible loops.

8. A protective blanket for animals comprising a sheet of material, means for fastening the front end of said sheet around an animal, and means for fastening the rear end of said last sheet to the rear legs of the animal, said last means comprising straps each being fixed at one end to the underside of the sheet, the straps being adapted to be passed under and around the rear legs of the animal, means fixed to the outer side of the sheet for attaching the free ends of the straps to the sheet, and a reinforcing band fixed to the sheet on the outside thereof and having its ends overlapping the ends of the straps fixed to the underside of the blanket.

Des Moines, Iowa, December 9, 1922.

WILLIAM EDWIN HAMLIN,